US011762765B2

(12) United States Patent
Boals et al.

(10) Patent No.: US 11,762,765 B2
(45) Date of Patent: Sep. 19, 2023

(54) ZONE BASED RECONSTRUCTION OF LOGICAL TO PHYSICAL ADDRESS TRANSLATION MAP

(71) Applicant: Micron Technology, Inc., Boise, ID (US)

(72) Inventors: Daniel A. Boals, Broomfield, CO (US); Byron D. Harris, Mead, CO (US); Karl D. Schuh, Santa Cruz, CA (US); Amy L. Wohlschlegel, Lafayette, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/341,338

(22) Filed: Jun. 7, 2021

(65) Prior Publication Data

US 2021/0294751 A1 Sep. 23, 2021

Related U.S. Application Data

(63) Continuation of application No. 16/146,955, filed on Sep. 28, 2018, now Pat. No. 11,030,089.

(51) Int. Cl.
*G06F 12/02* (2006.01)
*G06F 11/14* (2006.01)

(52) U.S. Cl.
CPC ...... *G06F 12/0246* (2013.01); *G06F 11/1471* (2013.01); *G06F 2201/84* (2013.01); *G06F 2212/7201* (2013.01)

(58) Field of Classification Search
None
See application file for complete search history.

(56) References Cited

U.S. PATENT DOCUMENTS

2003/0167380 A1‡ 9/2003 Green ................ G06F 11/1446
                                                                711/136
2011/0258391 A1‡ 10/2011 Atkisson ............. G06F 12/0804
                                                                711/118

(Continued)

OTHER PUBLICATIONS

International Search Report and Written Opinion for International Patent Application PCT/US2019/053306 dated Sep. 26, 2019, 7 pages.‡

(Continued)

*Primary Examiner* — Stephanie Wu
(74) *Attorney, Agent, or Firm* — Lowenstein Sandler LLP

(57) ABSTRACT

A zone is loaded onto a first memory component of a storage system, wherein the zone comprises one or more regions of data blocks comprising a first plurality of logical block addresses (LBAs), and a snapshot of each of the one or more regions is stored on a second memory component of the storage system and is associated with a version identifier. A particular version identifier associated with a respective snapshot of a region is identified, and a set of journals stored on the second memory component are identified, wherein the set of journals comprise a second plurality of LBAs mapped to a second plurality of physical block addresses. The one or more regions of the zone are reconstructed, wherein the reconstructing comprises reading the second plurality of LBAs of the set of journals to identify a first logical block address (LBA) that matches with a second LBA within the first plurality of LBAs on the loaded zone on the first memory component, and updating a physical block address corresponding to the second LBA on the loaded zone with a physical block address corresponding to the first LBA from the set of journals.

20 Claims, 5 Drawing Sheets

(56) References Cited

U.S. PATENT DOCUMENTS

| | | | |
|---|---|---|---|
| 2013/0080828 A1 ‡ | 3/2013 | Sheffield | G06F 11/1662 714/6.22 |
| 2014/0089264 A1 ‡ | 3/2014 | Talagala | G06F 3/0616 707/649 |
| 2014/0115232 A1 ‡ | 4/2014 | Goss | G06F 11/1471 711/103 |
| 2014/0310483 A1 * | 10/2014 | Bennett | G06F 3/0644 711/154 |
| 2015/0058539 A1 ‡ | 2/2015 | Huang | G06F 16/2228 711/103 |
| 2017/0075807 A1 ‡ | 3/2017 | Tomlin | G06F 12/0253 |
| 2017/0123991 A1 ‡ | 5/2017 | Sela | G06F 12/0246 |
| 2017/0147441 A1 * | 5/2017 | Binford | G06F 11/1435 |
| 2017/0322888 A1 | 11/2017 | Booth et al. | |
| 2018/0004650 A1 * | 1/2018 | Battaje | G06F 12/1009 |
| 2018/0004651 A1 | 1/2018 | Battaje et al. | |
| 2018/0004656 A1 ‡ | 1/2018 | Battaje | G06F 12/0292 |
| 2018/0081765 A1 ‡ | 3/2018 | Camp | G06F 11/1435 |
| 2018/0143886 A1 ‡ | 5/2018 | Liu | G06F 12/0246 |
| 2018/0357164 A1 ‡ | 12/2018 | Lee | G06F 12/1009 |

OTHER PUBLICATIONS

The extended European search report for EP Application No. 19867568.8, dated Jun. 1, 2022, 9 pages.
Office Action for Korean Application No. 10-2021-7010939, dated Jun. 19, 2023, 14 Pages.

\* cited by examiner
‡ imported from a related application

ZONE BASED RECONSTRUCTION OF LOGICAL TO PHYSICAL ADDRESS TRANSLATION MAP

RELATED APPLICATIONS

This application is a continuation application of co-pending U.S. patent application Ser. No. 16/146,955 filed Sep. 28, 2018, which is herein incorporated by reference.

TECHNICAL FIELD

The present disclosure generally relates to a translation map, and more specifically, relates to zone based reconstruction of a logical to physical address translation map.

BACKGROUND

A storage system may include one or more memory components that store data. For example, a solid-state drive (SSD) may include memory components such as non-volatile memory components. The SSD may further include an SSD controller that may manage each of the memory components and allocate data to be stored at the memory components. A host system may utilize the SSD and request data from the SSD. The SSD controller may be used to retrieve data from the corresponding memory components and return the retrieved data to the host system.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
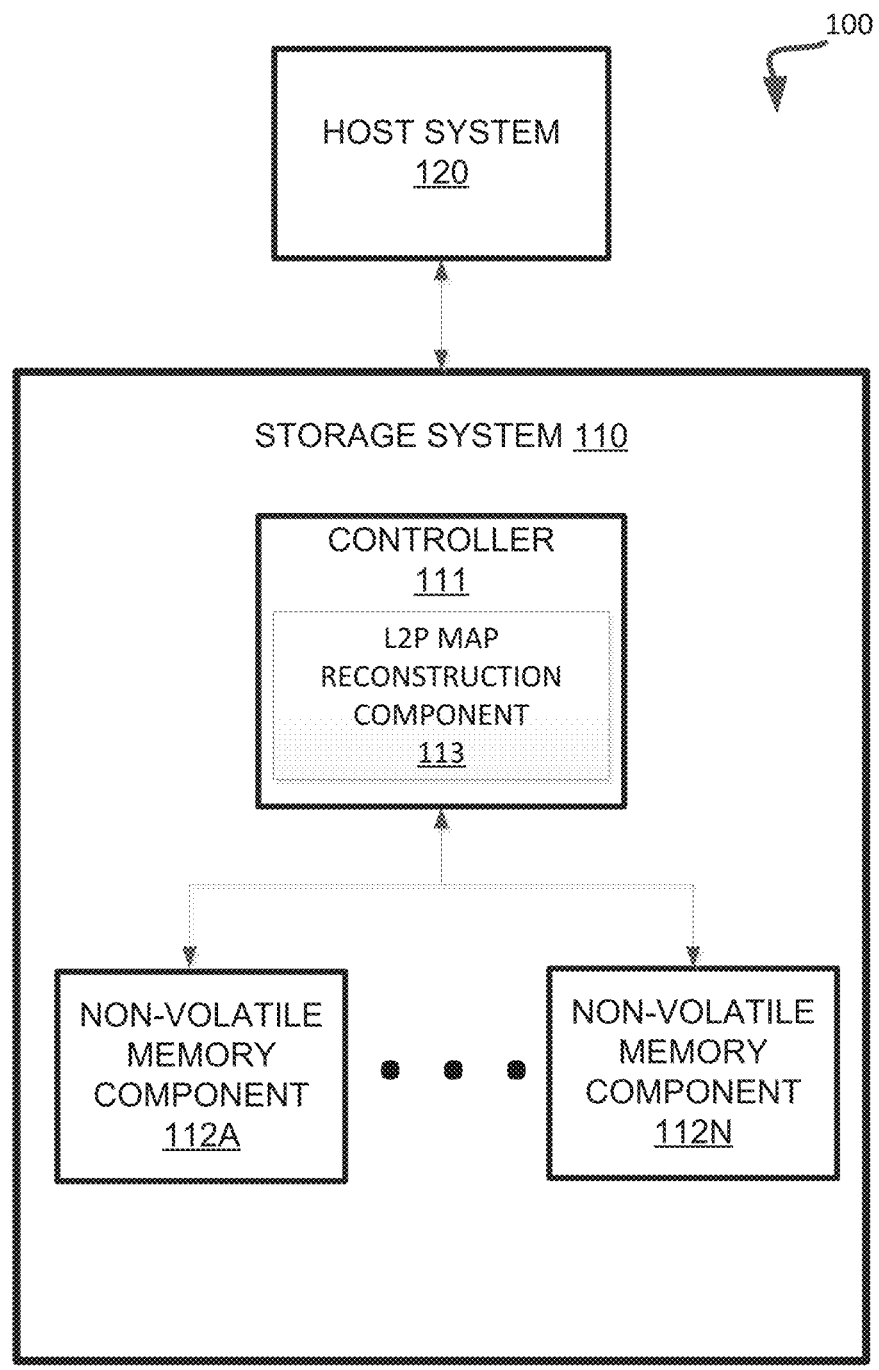
FIG. 1 illustrates an example computing environment that includes a storage system in accordance with some embodiments of the present disclosure.

Aspects of the present disclosure are directed to reconstructing a logical to physical address translation map. In general, a host system may utilize a storage system to store data. The host system may provide data to be stored on the storage system. The data may be stored and retrieved from the memory components within the storage system. An example of a storage system is a solid-state drive (SSD) that includes non-volatile memory and a controller to manage the non-volatile memory. A non-volatile memory is a type of memory capable of maintaining stored data when power is turned off and retrieving the stored data after power is turned back on. An example of a non-volatile memory may include a negative-and (NAND) type flash memory. On the other hand, a volatile memory is a type of memory that maintains data while powered on. An example of a volatile memory may include some random access memory (RAM) devices, although not all RAM devices are volatile memory. In addition, a type of RAM known as "cache memory" may be used to store data, providing faster access to data when requested.

The controller of an SSD may manage the storing and retrieving of data. When the host system requests to store or retrieve data, the controller may use a logical address to physical address (L2P) translation table or map. An L2P map may include an identifier to a logical block address (LBA) mapped to an identifier of a corresponding physical address, such as, a flash physical address (FPA). The L2P map may include logical block addresses in a logically consecutive order. When the host system requests to store or retrieve data, the controller may use the L2P map to identify a logical address and find or assign a corresponding physical address to store or retrieve the data to/from. In an example, if the host system requests to store data at a specific logical address or retrieve data from a specific logical address, the controller may identify the specific logical address on the L2P map, and identify the corresponding physical address where the data is stored or is to be stored. The mapping relationship between a particular logical address and a particular physical address may change as a result of write operations. For example, the L2P map may identify a first physical address corresponding to a first logical address where a first data is stored at a given time. Upon request from the host system to update the first data stored at the first logical address with a second data, the controller may write the second data to a second physical address, and update the mapping of the L2P map so that the second physical address is mapped to the first logical address. Thus, if the host system requests to retrieve data stored at the first logical address, the controller may identify the first logical address on the updated L2P map, find the corresponding physical address to be the second physical address, and retrieve the updated data (e.g., the second data).

The L2P map itself may be stored on the storage system. For example, the latest version of the L2P map may be stored on a flash translation layer (FTL) data block stripe of a NAND type flash memory. A controller may also use a caching environment for the data storing and retrieving process. For example, the caching environment may be used for faster access to data at the time of processing. The caching environment may use a type of memory that is capable of providing fast access to data, such as a RAM, cache memory, etc. The controller may load the latest snapshot of the L2P map from the FTL data block stripe onto an additional memory (e.g., a RAM, DDR, cache memory, etc.) for accessing the data from that additional memory during runtime. A snapshot is data describing the state of a system at a particular point in time. The controller may update the portion of the L2P map on the additional memory based on requests from the host system. Furthermore, the controller may periodically take snapshots of the updated L2P map on the additional memory and store it back to the FTL data block stripe. In some examples, if the entire L2P map does not fit in the additional memory, the controller may load snapshots of portions of the L2P map, use the portion as necessary and store an updated snapshot of the portion back to the FTL data block stripe. The controller may then remove the portion and load another portion of the L2P map onto the additional memory. Additionally, the controller may store a chronological log of the write operations of the user data as journals, where each journal may include some portions of logical address and corresponding physical address in a chronological order of the write operations as performed. Thus, a journal may be considered a record of write operations that have been performed at the storage system.

A situation may arise when the update to the L2P map on the additional memory may become unavailable before being stored back to the FTL data block stripe. For example, the data on the additional memory may become unavailable due to an event such as a hardware failure, power loss, data corruption, etc. This would cause the latest write requests by the host system to not be reflected in the latest version of the L2P map stored on the FTL data block stripe. Thus, in the event the updated L2P map becomes unavailable before being stored back to the FTL data block stripe, the updated L2P map may need to be reconstructed in order for the host system to have access to the latest data. Conventionally, one way to reconstruct the L2P map may be based on the write operations. Write operations may be available on the journals stored on the storage system. The write operations may be read from the journals in the chronological order as they were stored, and for each write operation, the logical address and corresponding physical address may be identified. The logical address in one journal entry and the logical address in the next journal entry may not be on the same portion of the L2P map that fits into the additional memory. As such, the controller may replay (e.g., read) one journal entry, identify the logical address therein and load a first portion of the L2P map that contains the logical address to update the physical address based on the first journal entry. The controller may then read the next journal entry, identify another logical address therein which may be on another portion of the L2P map different from the first portion of the L2P map. The controller may flush the first portion out and load the other portion to perform the update. The controller may need to reload the first portion for the next journal entry and so on. This may cause "thrashing" or frequent and repetitive swapping of data back and forth between the different memories, which may create performance issues and resource unavailability. Furthermore, the chronological journal replay may lead to an increased amount of time to initiate the storage system for providing access to the most recent data. In addition, the reconstruction based on chronological journal replay may add overhead to the restart process from a power loss event and slow down the data write operations after the restart.

Aspects of the present disclosure address the above and other deficiencies by using a zone based reconstruction of a logical address to physical address (L2P) translation map (hereinafter referred to as "L2P translation map" or "translation map"). The storage system may identify a "zone" or a portion of a L2P translation map to be loaded on a memory. A zone may include regions of data blocks. Each region may include consecutive entries of the L2P map. The size of the zone may be determined such that the portion of the L2P map may fit concurrently within the available space in the memory. The storage system may load the zone onto memory by identifying and loading the latest snapshots of the portion of the L2P map from the FTL data block stripe. For example, the storage system may load a zone with three regions of L2P map that fit in the memory from the last three snapshots of the regions stored in the FTL data block stripe. Each region may be associated with a data version (e.g., a sequence number of a data write), indicating the order in which the data was written on the FTL data block stripe. The storage system may identify the region with the oldest data version (e.g., having the earliest sequence number) out of the regions loaded onto the memory. The storage system may identify write operations that were performed after the last snapshots of the regions were stored on the FTL data block stripe. For example, the storage system may identify journals having younger data versions (e.g., having later sequence numbers) than the oldest region within the loaded zone. The storage system may replay each of the entries of the identified journals (e.g., read chronological entries of the write operations from the log in the journals) and identify if the logical address in the journal matches with the logical address within the loaded zone. If there is a matching logical address, the physical address corresponding to the matching logical address within the zone may be updated using the physical address in the journal entry. Once the storage system finishes assessing all write operations performed after the last snapshots of the portion of L2P map is stored, the loaded portion of the L2P map may be up to date. The storage system may store a new snapshot of the loaded portion onto the FTL map and load the next zone of the L2P map to continue performing the zone based assessment and reconstruction. It is not necessary for the storage system to swap regions back and forth onto the memory since the regions that fit within the memory are completely updated based on all later data write operations, before the regions are written back to the FTL data block stripe. This also allows for reconstruction of each zone independent of reconstruction of other zones, which may allow for using multiple processors to perform reconstruction of multiple zones and speed up the reconstruction process.

Advantages of the present disclosure include, but are not limited to, the increased performance of the storage system as the L2P map may be reconstructed for the storage system more efficiently, while the quality of service provided by the storage system may increase by meeting time to ready requirement for getting the storage system up to date and brought back to an operational state in less time. As a result of the zone based reconstruction of the L2P map, data storing and retrieval requests from the host system may be provided more efficiently, completely and without error, since valuable computing resources are not wasted on swapping data in and out of memory causing thrashing issues. Moreover, a power up mechanism from a power loss scenario may be faster and more efficient, since reconstruction of different portions of the L2P map may be performed by multiple processors.

FIG. 1 illustrates an example computing environment 100 that includes a storage system 110. In general, the computing environment 100 may include a host system 120 that uses the storage system 110. For example, the host system 120 may write data to the storage system 110 and read data from the storage system 110.

The host system 120 may be a computing device such as a desktop computer, laptop computer, network server, mobile device, or such computing device that includes a memory and a processing device. The host system 120 may include or be coupled to the storage system 110 so that the host system 120 may read data from or write data to the storage system 110. For example, the host system 120 may be coupled to the storage system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface may be used to transmit data between the host system 120 and the storage system 110. The host system 120 may further utilize an NVM Express (NVMe) interface to access the memory components 112A to 112N when the storage system 110 is coupled with the host system 120 by the PCIe interface.

As shown in FIG. 1, the storage system 110 may include a controller 111 and memory components 112A to 112N. In some embodiments, the memory components 112A to 112N may be based on non-volatile memory. For example, the memory components 112A to 112N may be a negative-and (NAND) type flash memory. Each of the memory components 112A to 112N may include one or more arrays of memory cells such as single level cells (SLCs) or multi-level cells (MLCs) (e.g., triple level cells (TLCs) or quad-level cells (QLCs)). In some embodiments, a particular memory component may include both SLC memory cells and MLC memory cells. Each of the memory cells may store one or more bits of data (e.g., data blocks) used by the host system 120. Although non-volatile memory components such as NAND type flash memory are described, the memory components 112A to 112N may be based on any other type of non-volatile memory or volatile memory. For example, the memory components 112A to 112N may be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. The memory components 112A to 112N may include any combination of the different types of non-volatile memory or volatile memory. Furthermore, the memory cells of the memory components 112A to 112N may be grouped as memory pages or data blocks that may refer to a unit of the memory component used to store data.

The controller 111 may communicate with the memory components 112A to 112N to perform operations such as reading data, writing data, or erasing data at the memory components 112A to 112N and other such operations. Furthermore, the controller 111 may include hardware such as one or more integrated circuits and/or discrete components, a processing device, a buffer memory, software such as firmware or other instructions, or a combination thereof. In general, the controller 111 may receive commands or operations from the host system 120 and may convert the commands or operations into instructions or appropriate commands to achieve the desired access to the memory components 112A to 112N. The controller 111 may be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 111 may further include host interface circuitry to communicate with the host system 120 via the physical host interface. The host interface circuitry may convert the commands received from the host system into command instructions to access the memory components 112A to 112N as well as convert responses associated with the memory components 112A to 112N into information for the host system 120.

Referring to FIG. 1, the controller 111 may include an L2P map reconstruction component 113 that may be used to reconstruct an L2P translation map stored on the storage system 110. For example, the L2P map reconstruction component may identify a portion of the L2P map from latest snapshots of the L2P map stored on the storage system 110. The L2P map reconstruction component 113 may identify write operations performed after the after the latest snapshots of the portion of the L2P map was stored on the storage system 110. The L2P map reconstruction component may update the portion of the L2P map based on the snapshots and the identified write operations. Further details with regards to the operations of the L2P map reconstruction component 113 are described below.

The storage system 110 may include additional circuitry or components that are not illustrated. For example, the storage system 110 may include a cache or buffer (e.g., DRAM) and address circuitry (e.g., a row decoder and a column decoder) that may receive an address from the controller 111 and decode the address to access the memory components 112A to 112N.

Figure 2:
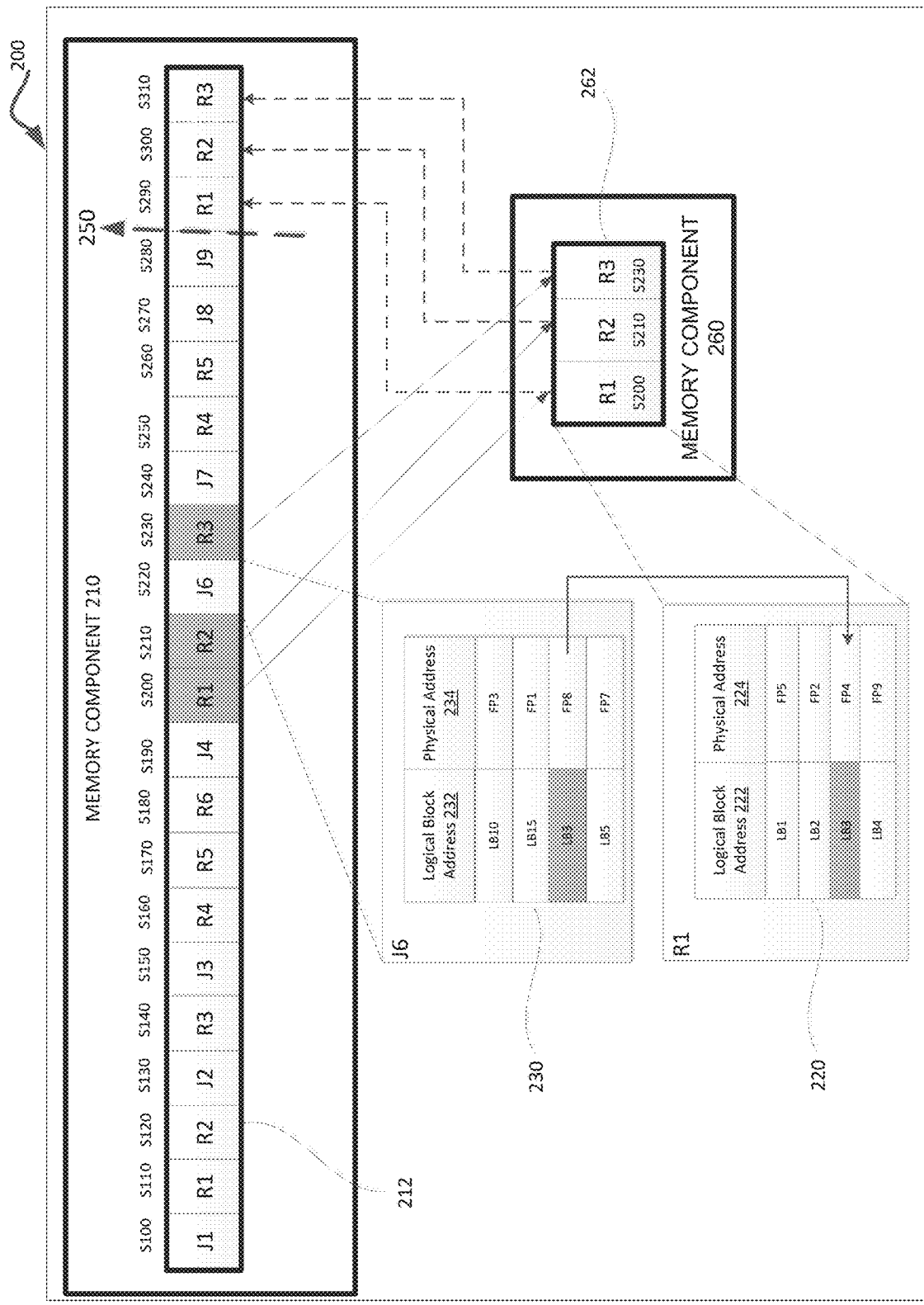
FIG. 2 illustrates reconstructing a logical to physical address translation map in accordance with some embodiments of the present disclosure.

FIG. 2 illustrates the zone based reconstruction of an L2P map stored at a storage system 200. In general, the storage system 200 may correspond to the storage system 110 of FIG. 1. In some examples, the L2P reconstruction component 113 of the controller, as described in FIG. 1, may perform the operations described in reference to FIG. 2.

As shown in FIG. 2, the storage system 200 may include one or more memory components, such as memory component 210 and memory component 260. In one example, memory component 210 may be a NAND type flash memory and the memory component 260 may be a random access memory (RAM), such as a DRAM (dynamic RAM), SDRAM (Synchronous DRAM), DDR (double data rate SDRAM), etc. The memory components may store data in blocks (e.g., a granularity of storage portions) at data block locations. Multiple data block locations may make up a data block stripe. The memory components may allocate various data block stripes for various purposes. For example, memory component 210 may include host data block stripes (not shown) to store user data received from the host system and flash translation layer (FTL) block stripes 212 to store data relevant to translation of logical addresses to physical addresses and vice versa.

During runtime, the host system may request to retrieve user data and store user data. User data from the host system may be received by the storage system 200 to be stored or may be retrieved from the storage system 200. The user data may be a series of user data to be written logically and sequentially on the storage system 200. For example, user data from a series of write requests may be received to be stored at the memory component 210. The storage system may identify data block locations of the memory component 210 on storage system 200 where the received user data may be stored. The data block locations may be a series of data block locations on the host data block stripes where the series of user data may be written sequentially in the order received. Each of the data block locations may be assigned a physical address, such as a flash physical address (FPA).

The request from the host system may provide a logical block address for storing and retrieving user data. The storage system may translate the logical block address to the physical block address of the memory component 210 where the data is stored or to be stored. The storage system may use an L2P translation table or map ("L2P map"). The storage system may store the L2P map on the storage system. For example, the latest version of the L2P map may be stored on the FTL data block stripe 212 ("FTL 212"). The storage system may store a portion of the L2P map at a data block location of the FTL 212 as a region. Each region may include a collection of consecutive entries of the L2P map. The size of each region may be determined such that the entries of the region fit into one slot or one NAND page. As each region is written on the FTL 212, it may be associated with a data version (e.g., a sequence number) that indicates the order in which the data was written on the storage system. For example, region R1 may be a portion of an L2P map 220 containing consecutive logical block addresses LB1-LB4 stored on the FTL 212. FTL 212 is depicted as storing a version of region R1 associated with a sequence number S110. The sequence numbers S100-S310 depicted on FIG. 2 may be multiple ordered sequence numbers, indicating the order in which data is written to the storage system. Additionally, other regions R2-R6 are depicted as being stored on the FTL 212.

An L2P map may include logical block addresses (LBA) 222 mapped to corresponding physical addresses 224, such as, a flash physical address (FPA). The L2P map may include logical block addresses in a logically consecutive order. For example, logical block addresses LB1, LB2, LB3, LB4, etc. of the portion of L2P map 220 may represent a series of consecutive LBAs. When the host system requests to store or retrieve data, the storage system may use the L2P map to identify a logical block address and find or assign a corresponding physical address to store or retrieve the data to/from. In an example, if the host system requests to retrieve user data from logical address LB1, the storage system may identify the LBA on the portion of map 220, identify the corresponding physical address FP5 where the user data is stored, and retrieve the user data that is stored on physical address FP5, which may be located on the host data stripe (not shown) on memory component 210.

The mapping relationship between a particular logical address and a particular physical address may change as a result of write operations over time. For example, the portion of L2P map 220 may include a physical address FP2 corresponding to logical address LB2 where a first user data D1 is stored at time T1. Upon request from the host system to update the user data stored at logical address LB2 with a second user data D2, the storage system may write the second user data D2 to another physical address FP6. The storage system may update the mapping of the portion of L2P map 220 at time T2, so that the physical address FP6 would be mapped (not shown) to the logical address LB2 from time T2. Thus, if the host system requests to retrieve data stored at the logical address LB2 after time T2, the storage system may identify it on an updated L2P map, determine that the corresponding physical address is FP6, and retrieve the updated user data D2 that is stored at the physical address FP6. As a result, the mapping relationship within the L2P map may change over time.

The storage system may also keep a chronological log of the data write operations. For example, as the data is stored on the storage system based on requests from the host system, a log of the data write operations may be stored on FTL 212 in a journal. A journal may include a set of chronological data write operations to identify where the user data is being written to, including a requested LBA and corresponding FPA. As each journal is written on the FTL 212, it may be associated with a data version (e.g., a sequence number) that indicates the order in which the data was written on the storage system. For example, a journal J6 may be a portion of a log 230 including requested logical block addresses 232 and the corresponding physical addresses 234 where the user data is stored. J6 may contain chronological data write operations that include logical block addresses LB10, LB15, LB3, LB5, and corresponding physical addresses, in that order in which the data was written. For example, the FTL 212 is depicted as storing journal J6 associated with a sequence number S220.

The storage system may also use a caching environment for faster access to data during runtime. For example, memory component 260 may be used for the caching environment. The storage system may load the latest snapshot of the L2P map from the FTL onto memory component 260 (e.g., a RAM, DDR, cache memory, etc.) for access during runtime. The storage system may update the portion of the L2P map on memory component 260 based on requests from the host system. The storage system may periodically take snapshots of the latest L2P map on memory component 260 and store it back to the FTL 212. FTL 212 is depicted as including another snapshot of region R1 stored later in the FTL 212 and associated with sequence number S200. Additionally, updated snapshots of regions R2-R5 are depicted as being stored on later portion of FTL 212, starting with sequence number S210 associated with the latest snapshot of region R2.

If a situation arises when the update to the L2P map on the memory component 260 may become unavailable before being stored back to FTL 212, the L2P map may need to be reconstructed. There may be various reasons for updated data to be unavailable on the memory component 260. For example, the data on the memory 260 may become unavailable due to an event such as a power loss, hardware failure, resource unavailability, resource limitation, data corruption, etc. This may cause the latest write requests by the host system to not be reflected in the latest version of the L2P map stored on the FTL 212. For example, R1 may have been further updated since being stored in association with sequence number S200, however, before the new snapshot reflecting this update to R1 is stored back to the FTL 212, the storage system may experience a power loss at point 250.

When the storage system is powered up again, the storage system may reconstruct the latest L2P map in order for the host system to have access to the latest data. In order to reconstruct the L2P map, the storage system may identify a "zone," or a portion of the L2P map, to be loaded onto memory component 260. The zone is identified by selecting the portion of the translation map that can be loaded onto the memory component 260 based on the size of the free space of the memory component 260. A zone may include regions of data blocks having portions of the L2P map. The size of the zone may be determined such that the regions fit concurrently within the available space in the memory component 260. The storage system may load the determined zone onto memory component 260 by identifying and loading the latest snapshots of the regions (e.g., portions of the L2P map) stored on the FTL 212. As used herein, the term "loading" may refer to "placing," "copying," "transferring," etc. As such, a zone (e.g., portion of the map) can be loaded onto memory component 260 by being placed or copied onto the memory component 260. For example, the storage system may load a zone 262 with three regions of the L2P map R1, R2, and R3 that fit in the memory component 260. The zone 262 may be obtained from the last three snapshots of the regions R1, R2, and R3 stored in the FTL 212. Each of the regions R1, R2, and R3 on the loaded zone 262 may be associated with sequence numbers S200, S210, and S230 as stored on the FTL 212. The storage system may identify the region with the oldest data version (e.g., having the earliest sequence number) out of the regions R1, R2, and R3 loaded onto the memory component 260 and determine R1 to be the oldest region having an earlier sequence number S200 of the sequence numbers S200, S210 and S230.

The storage system may identify write operations that were performed after the last snapshots of the regions were stored on the FTL data block stripe. For example, the storage system may identify journals having younger data versions (e.g., having later sequence numbers) than the oldest region within the loaded zone. For example, the storage system may determine that journal J6 stored on FTL 212 is associated with sequence number S220, which is later than the sequence number S200 of the latest snapshot of region R1 loaded on memory component 260. The storage system may further determine that journals J6 through J9 stored on FTL 212 all have sequence numbers that are later than sequence number S200. The storage system may replay each of the entries of the identified journals J6 through J9 by reading the chronological entries of the write operations from journal entries.

The storage system may identify whether the logical address in each of the journals matches with the logical address within the loaded regions within the zone. If there is a matching logical address, the physical address corresponding to the matching logical address within the zone may be updated by using the physical address in the journal entry. For example, the storage system may replay journal J6 and determine that logical addresses LB10 and LB15 on the journal entries are not found in regions R1-R3. However, logical address LB3 in journal J6 matches logical address LB3 on region R1. The storage system may replace the physical address FP4 corresponding to LB3 on the loaded region R1 on the memory component 260. The storage system may update the physical address to FP8 on loaded region R1 because the logical address LB3 corresponds to physical address FP8 on journal J6. The storage system may continue to read through the rest of the entries of journals J6 through J9 and update regions R1 through R3 loaded on memory component 260 as matching logical addresses are found.

Once the storage system finishes assessing all write operations performed after the last snapshot was stored, the loaded zone 262 containing regions R1-R3 (e.g., portions of the L2P map) may be up to date and ready for host system access. The storage system may store new snapshots of R1, R2, and R3 after being updated to FTL 212, which may be associated with sequence numbers S290, S300, and S310, respectively. The storage system may clear memory component 260 and load another zone of the L2P map to continue performing the zone based assessment and reconstruction. Since the regions R1-R3 of zone 262 concurrently fit within the memory 260 and are fully updated based on all later data write operations than the last snapshots of the regions, it may not be necessary to swap regions back and forth onto the memory before the regions are written back to the FTL data block stripe 212.

The zone based reconstruction may also allow for reconstruction of each zone independent of reconstruction of other zones. As such, multiple processors may perform the reconstruction of multiple zones to speed up the reconstruction process since reconstruction of one zone is not dependent on another zone. For example, the storage system may divide up the L2P map in a first zone containing regions R1 and R2, a second zone containing regions R3 and R4, and a third zone containing regions R5 and R6. Each of the zones may be assigned to a first, second, and a third processor, respectively, for reconstruction of the L2P map for those zones. The zones may be loaded onto a memory and the three processors may perform the reconstruction of the three zones at the same time. Since there is no dependency, multiple processors may be able to concurrently run the reconstruction and finish the reconstruction at a faster rate than having one processor perform the reconstruction. This allows for the storage system to be brought back to operational state in a much faster fashion, making available computer resources for other important tasks and to give access to the updated data to host system without delay. In some implementations, the most recent portions of the journals may be rebuilt when the most recent journals were not successfully stored during a power loss event. In such a scenario, stored journals are compared to metadata stored along with user data from the storage system. Missing transactions on the stored journals may be identified and extracted using the metadata comparison and be used to rebuild the most recent journals.

Figure 3:
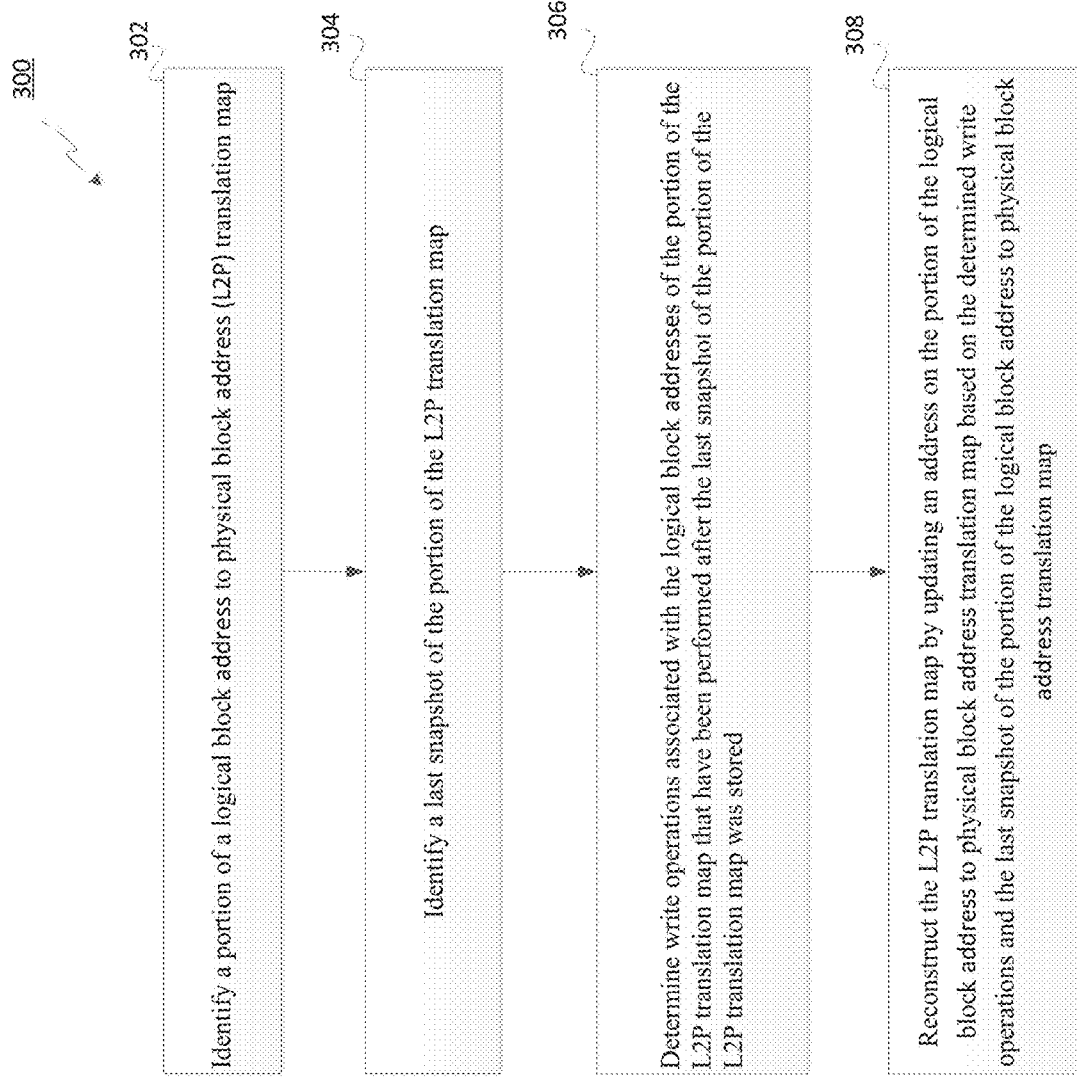
FIG. 3 is a flow diagram of an example method to reconstruct a logical to physical address translation map in accordance with some embodiments of the present disclosure.

FIG. 3 is a flow diagram of an example method 300 for reconstructing a logical to physical address translation map. The method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the L2P map reconstruction component 113 of FIG. 1.

As shown in FIG. 3, the method 300 may begin, at block 302, with processing logic identifying a portion of a logical block address to physical block address (L2P) translation map. For example, the portion may be identified such that the portion concurrently fit within a memory. For example, the memory may be a random access memory (RAM) and the identified portion may be a portion of the translation map that can be loaded onto the free space available within the RAM so as to concurrently fit within the free space of the RAM. In one example, the portion of the L2P translation map may identify a logical block address and a corresponding physical block address.

At block 304, the processing logic identifies a last snapshot of the portion of the L2P translation map. The last snapshot is the snapshot of the portion that was saved in the storage system last in time among multiple snapshots of the portion of the most updated L2P translation map that are periodically stored in the storage system. For example, the last snapshot of the portion of the L2P translation map can be stored on data blocks of the storage system (e.g., non-volatile memory). The last snapshot of the portion of the L2P translation map can be obtained from the storage system and loaded onto the memory (e.g., a volatile memory).

At block 306, the processing logic determines write operations associated with the logical block addresses of the portion of the L2P translation map. The write operations may have been performed after the last snapshot of the portion of the L2P translation map was stored. For example, an identification of the write operations can be stored on the data blocks of the storage system. The write operations can be recorded in a journal (or log).

At block 308, the processing logic reconstructs the L2P translation map by updating an address on the portion of the L2P translation map based on the determined write operations and the last snapshot of the portion of the L2P translation map. In one example, for each given logical block address of each of the write operations, updating the portion can include the processing logic identifying a match between a logical block address of the write operations and the portions of the map. The processing logic can then update a physical address corresponding to the matching logical address on the portions of the map. The physical address on the portions can be updated to the physical address that correspond to the given logical block address of the write operations. In an example, upon completion of updating the portions on the memory, the processing logic can store a new snapshot of each of the portions back to the data blocks of the storage system. For example, the updated portion of the L2P translation map at the volatile memory can be stored at the non-volatile memory.

Figure 4:
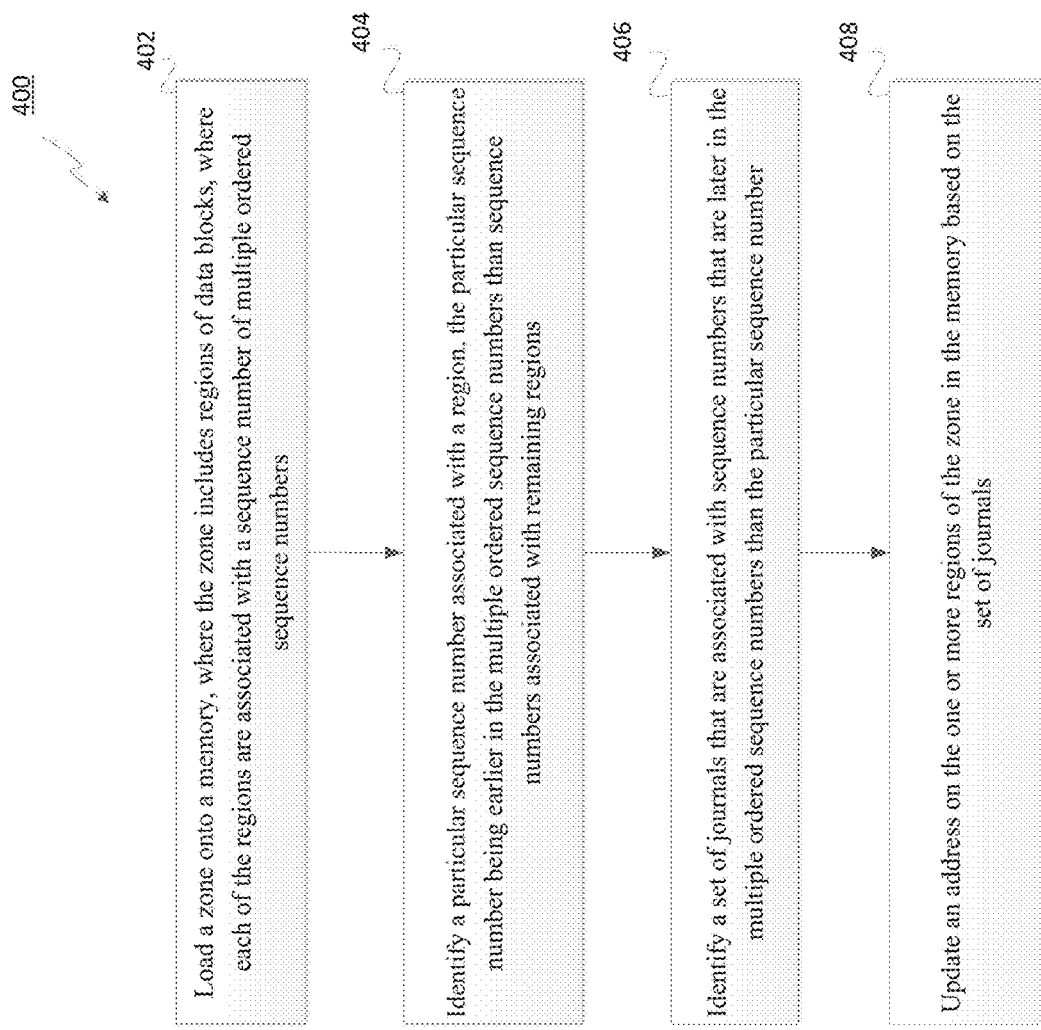
FIG. 4 is a flow diagram of an example method to reconstruct a logical to physical address translation map in accordance with some embodiments of the present disclosure.

FIG. 4 is a flow diagram of an example method 400 for reconstructing a logical to physical address translation map. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 can be performed by the L2P map reconstruction component 113 of the controller 111 of FIG. 1.

As shown in FIG. 4, the method 400 may begin, at block 402, with processing logic loading a zone onto a memory. The memory can be a random access memory (RAM). The zone can include regions of data blocks. In an example, each of the regions can include consecutive entries of a logical to physical (L2P) translation table or map. In one example, the logical to physical translation table can include a logical block address (LBA) and a corresponding physical address. In an example, the regions can be obtained from latest snapshots of portions of the L2P table. In an example, the snapshots can be stored on data blocks of a storage system. In one example, each of the regions can be associated with a sequence number. The sequence number can be part of multiple ordered sequence numbers.

At block 404, the processing logic can identify a particular sequence number associated with a region. The particular sequence number can be situated earlier in the ordered sequence numbers than sequence numbers associated with remaining regions. At block 406, the processing logic can identify a set of journals that are associated with sequence numbers that are situated later in the multiple ordered sequence numbers than the particular sequence number. In an example, each journal of the set of journals can include a set of chronological data write operations. The data write operations can be structured as a log. Each journal can represent a portion of the log.

At block 408, the processing logic can update the regions of the zone in the memory based on the set of journals. In one example, for each given logical block address of each of the journals, updating the regions can include the processing logic identifying a match between a logical block address of the journal and the regions loaded onto memory. The processing logic can then update a physical address corresponding to the matching logical address on the regions loaded onto memory. The physical address on the regions can be updated to the physical address that correspond to the given logical block address of the journal. In an example, upon completion of the update to the regions on the memory, the processing logic can store a new snapshot of each of the regions back to the data blocks of the storage system.

Figure 5:
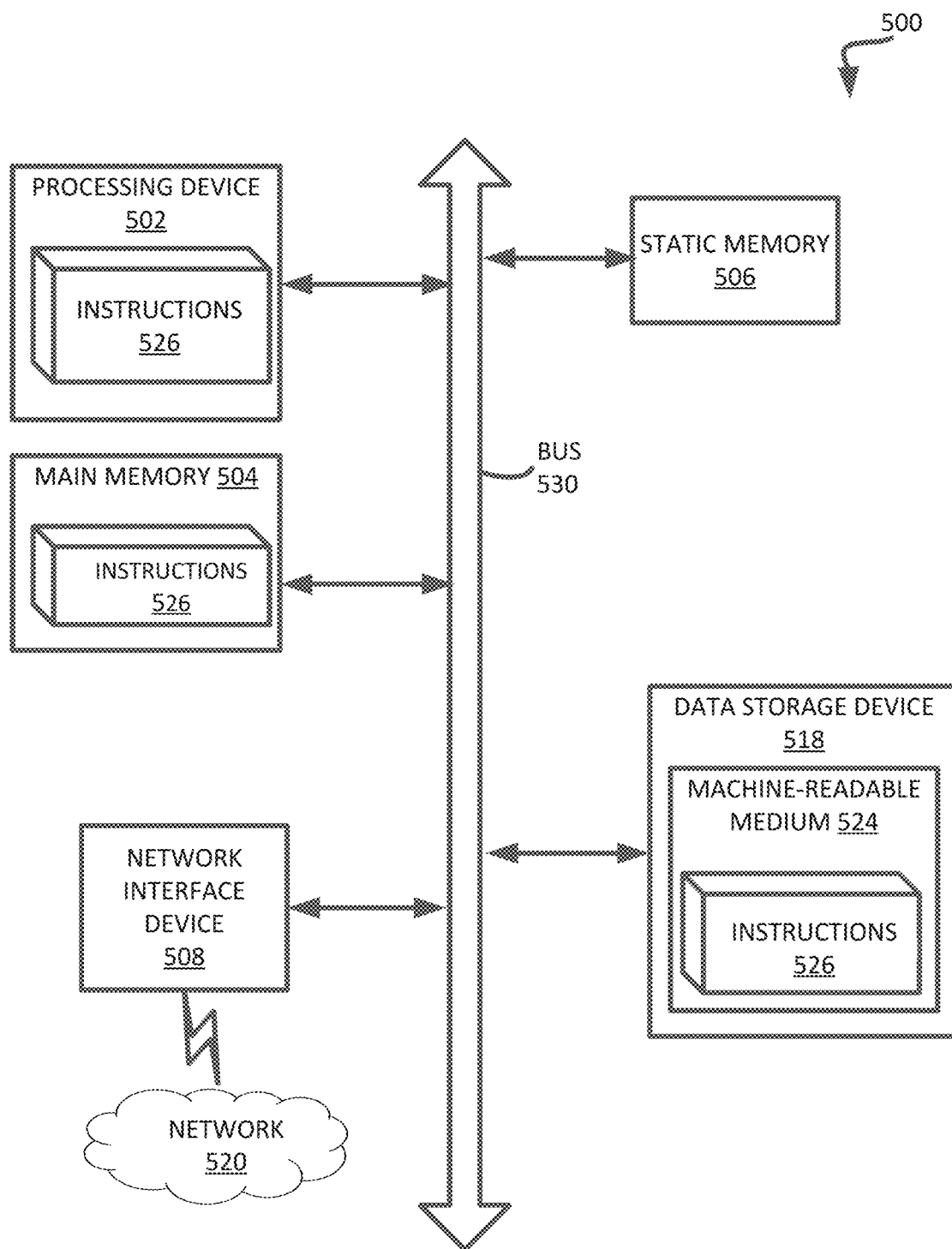
FIG. 5 is a block diagram of an example computer system in which implementations of the present disclosure may operate.

FIG. 5 illustrates an example machine of a computer system 500 within which a set of instructions, for causing the machine to perform any one or more of the methodologies discussed herein, may be executed. For example, the computer system 500 may correspond to a host system (e.g., the host system 120 of FIG. 1) that includes or utilizes a storage system (e.g., the storage system 110 of FIG. 1) or may be used to perform the operations of a controller (e.g., to execute an operating system to perform operations corresponding to the L2P map reconstruction component 113 of FIG. 1). In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530. Processing device 502 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 may further include a network interface device 508 to communicate over the network 520.

The data storage system 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 may correspond to the storage system 110 of FIG. 1.

In one implementation, the instructions 526 include instructions to implement functionality corresponding to an L2P map reconstruction component (e.g., L2P map reconstruction component 113 of FIG. 1). While the machine-readable storage medium 524 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure may refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus may be specially constructed for the intended purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   loading a zone onto a first memory component of a storage system, wherein the zone comprises one or more regions of data blocks comprising a first plurality of logical block addresses (LBAs) mapped to a first plurality of physical block addresses, wherein a snapshot of each of the one or more regions is stored on a second memory component of the storage system and is associated with a version identifier;
   identifying a particular version identifier associated with a respective snapshot of a region of the one or more regions, the particular version identifier indicating an older version than versions associated with respective snapshots of remaining regions of the one or more regions;
   identifying a set of one or more journals stored on the second memory component that are associated with version identifiers indicating more recent versions than the older version, wherein each journal of the set of one or more journals comprises a second plurality of LBAs mapped to a second plurality of physical block addresses; and
   reconstructing the one or more regions of the zone, wherein the reconstructing comprises:
      reading the second plurality of LBAs of each journal of the set of one or more journals from the second memory component to identify a first logical block address (LBA) that matches with a second LBA within the first plurality of LBAs of the zone loaded onto the first memory component; and
      updating a physical block address corresponding to the second LBA in the zone with a physical block address corresponding to the first LBA identified from the set of one or more journals read from the second memory component.

2. The method of claim 1, wherein the first plurality of LBAs are ordered in a logically consecutive order within the one or more regions of data blocks, and the second plurality of LBAs are ordered in a chronological order in which the second plurality of LBAs were written.

3. The method of claim 1, wherein each of the one or more regions of data blocks comprises a plurality of consecutive entries of a logical to physical translation table.

4. The method of claim 3, wherein the logical to physical translation table comprises a logical block address (LBA) and a corresponding physical address.

5. The method of claim 3, wherein the one or more regions are obtained from latest snapshots of portions of the logical to physical translation table, the latest snapshots stored on a plurality of data blocks of a storage system.

6. The method of claim 1, wherein each journal of the set of one or more journals comprises a set of chronological data write logs.

7. The method of claim 1, further comprising:
   upon completion of reconstructing the one or more regions, storing another snapshot of each of the one or more regions on a non-volatile memory of the storage system.

8. A system comprising:
   a first memory component and a second memory component;
   a processing device, operatively coupled with the first memory component and the second memory component, to perform operations comprising:

loading a zone onto a first memory component of a storage system, wherein the zone comprises one or more regions of data blocks comprising a first plurality of logical block addresses (LBAs) mapped to a first plurality of physical block addresses, wherein a snapshot of each of the one or more regions is stored on a second memory component of the storage system and is associated with a version identifier;

identifying a particular version identifier associated with a respective snapshot of a region of the one or more regions, the particular version identifier indicating an older version than versions associated with respective snapshots of remaining regions of the one or more regions;

identifying a set of one or more journals stored on the second memory component that are associated with version identifiers indicating more recent versions than the older version, wherein each journal of the set of one or more journals comprises a second plurality of LBAs mapped to a second plurality of physical block addresses; and reconstructing the one or more regions of the zone, wherein the reconstructing comprises:
  reading the second plurality of LBAs of each journal of the set of one or more journals from the second memory component to identify a first logical block address (LBA) that matches with a second LBA within the first plurality of LBAs of the zone loaded onto the first memory component; and
  updating a physical block address corresponding to the second LBA in the zone with a physical block address corresponding to the first LBA identified from the set of one or more journals read from the second memory component.

9. The system of claim 8, wherein the first plurality of LBAs are ordered in a logically consecutive order within the one or more regions of data blocks, and the second plurality of LBAs are ordered in a chronological order in which the second plurality of LBAs were written.

10. The system of claim 8, wherein each of the one or more regions of data blocks comprises a plurality of consecutive entries of a logical to physical translation table.

11. The system of claim 8, wherein each journal of the set of one or more journals comprises a set of chronological data write logs.

12. The system of claim 8, wherein the processing device is to further perform operations comprising:
  upon completion of reconstructing the one or more regions, storing another snapshot of each of the one or more regions on a non-volatile memory of the storage system.

13. A non-transitory computer-readable medium comprising instructions that, when executed by a processing device, cause the processing device to perform operations comprising:
  loading a zone onto a first memory component of a storage system, wherein the zone comprises one or more regions of data blocks comprising a first plurality of logical block addresses (LBAs) mapped to a first plurality of physical block addresses, wherein a snapshot of each of the one or more regions is stored on a second memory component of the storage system and is associated with a version identifier;

identifying a particular version identifier associated with a respective snapshot of a region of the one or more regions, the particular version identifier indicating an older version than versions associated with respective snapshots of remaining regions of the one or more regions;

identifying a set of one or more journals stored on the second memory component that are associated with version identifiers indicating more recent versions than the older version, wherein each journal of the set of one or more journals comprises a second plurality of LBAs mapped to a second plurality of physical block addresses; and reconstructing the one or more regions of the zone, wherein the reconstructing comprises:
    reading the second plurality of LBAs of each journal of the set of one or more journals from the second memory component to identify a first logical block address (LBA) that matches with a second LBA within the first plurality of LBAs of the oaded zone loaded onto the first memory component; and
    updating a physical block address corresponding to the second LBA in the zone with a physical block address corresponding to the first LBA identified from the set of one or more journals read from the second memory component.

14. The non-transitory computer-readable medium of claim 13, wherein the first plurality of LBAs are ordered in a logically consecutive order within the one or more regions of data blocks, and the second plurality of LBAs are ordered in a chronological order in which the second plurality of LBAs were written.

15. The non-transitory computer-readable medium of claim 13, wherein each of the one or more regions of data blocks comprises a plurality of consecutive entries of a logical to physical translation table.

16. The non-transitory computer-readable medium of claim 15, wherein the logical to physical translation table comprises a logical block address (LBA) and a corresponding physical address.

17. The non-transitory computer-readable medium of claim 14, wherein the one or more regions are obtained from latest snapshots of portions of the logical to physical translation table, the latest snapshots stored on a plurality of data blocks of a storage system.

18. The non-transitory computer-readable medium of claim 13, wherein each journal of the set of journals comprises a set of chronological data write logs.

19. The non-transitory computer-readable medium of claim 13, the operations further comprising:
  upon completion of reconstructing the one or more regions, storing another snapshot of each of the one or more regions on a non-volatile memory of the storage system.

20. The non-transitory computer-readable medium of claim 13, wherein each journal of the set of one or more journals comprises a set of chronological data write logs.

* * * * *